Jan. 11, 1966     F. C. BRESK ETAL     3,228,672
SHOCK PROGRAMMER
Filed Aug. 19, 1963
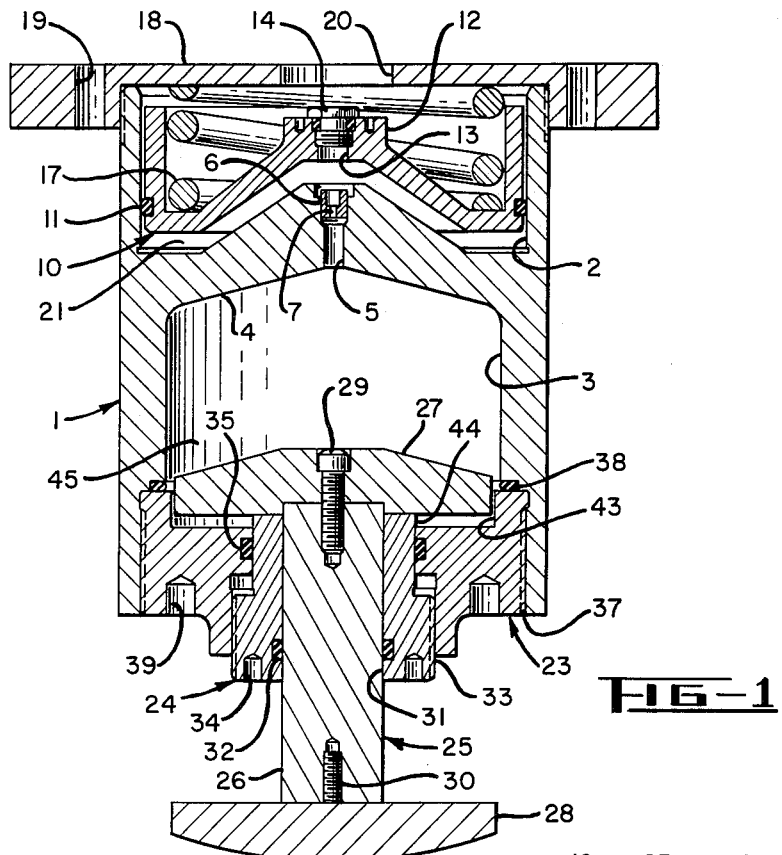
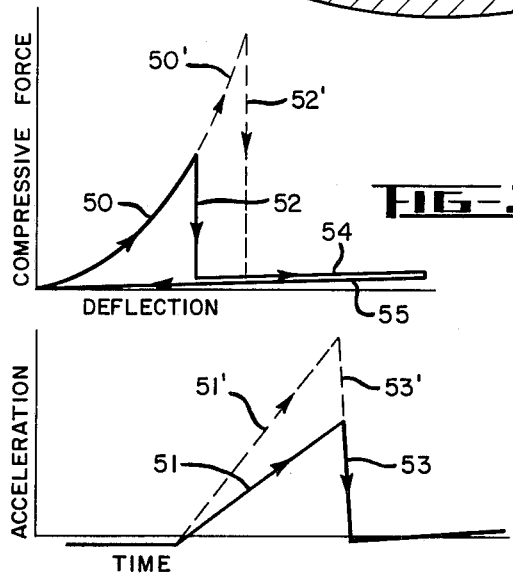
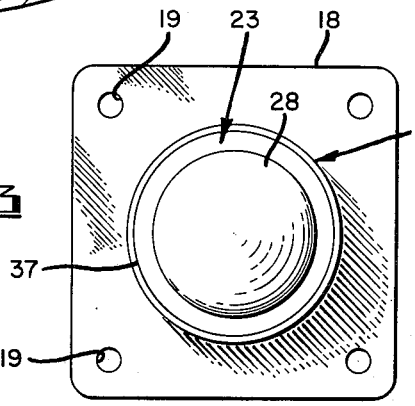
INVENTORS
FRANK C. BRESK
ROBERT P. GRAY
BY Leon F. Herbert
ATTORNEY

United States Patent Office 3,228,672
Patented Jan. 11, 1966

3,228,672
SHOCK PROGRAMMER
Frank C. Bresk and Robert P. Gray, Carmel Valley, Calif., assignors to Monterey Research Laboratory, Inc., Monterey, Calif., a corporation of California
Filed Aug. 19, 1963, Ser. No. 302,916
17 Claims. (Cl. 267—1)

This invention relates to means for cushioning the impact of a moving body against a relatively stationary mass. In partciular, the invention relates to the field of shock testing, in which the function of this invention is to provide a predetermined shape of shock pulse as represented by an acceleration versus time diagram.

In the field of shock testing, a number of different types of shock pulses are required such as half sine wave pulses, square wave pulses and sawtooth pulses. The sawtooth pulse is one of the more difficult to achieve and is the type of pulse with which the invention is particularly concerned.

The normal shock testing procedure is to place the desired programmer between the stationary impact portion of the shock testing machine and the moving test body, usually a drop table on which the test specimen is mounted. The spring rate of the programmer then determines the shape of the shock pulse. The reason that a sawtooth pulse is difficult to achieve is that it requires a programmer having a spring rate which increases with deflection up to a maximum value and then drops sharply to zero.

The object of the present invention is to provide an improved shock programmer.

Another object of the invention is to provide an improved shock programmer having a spring rate which increases with deflection up to a maximum value and then drops sharply to zero.

More specifically, an object of the invention is to provide an improved programmer for sawtooth shock pulses.

Another object of the invention is to provide a shock programmer having simplified means for adjusting the magnitude of the peak pulse acceleration.

A further object of the invention is to provide a shock programmer meeting the above objectives in a construction which is relatively simple to manufacture and operate.

By way of brief description, these and other objects of the invention are achieved by means of a programmer in the form of a fluid-filled container having a plunger slidingly sealed therein, and having means for causing initial inward movement of the plunger to create an increase in the pressure of said fluid and for causing subsequent inward movement of the plunger to create a sharp decrease in the pressure of the fluid.

Other and further objects and features of advantage will be apparent from the following detailed description which refers to the accompanying drawings in which:

FIGURE 1 is a cross section view on the centerline of a shock programmer according to the invention;

FIGURE 2 is an end view on reduced scale looking from the bottom of FIGURE 1;

FIGURE 3 is a force versus deflection, or spring rate, diagram which can be achieved with the programmer of FIGURE 1; and FIGURE 4 is an acceleration versus time, or pulse, diagram which can be achieved with the programmer of FIGURE 1.

Referring in more detail to the drawings, the programmer comprises a chamber-forming container or body 1. Container 1 is preferably made of metal having a cylindrical outer surface. The container is formed with a preferably cylindrical recess 2 at its upper end and a preferably cylindrical recess 3 at its lower end. A stationary partition wall 4 in the container separates recesses 2 and 3. Wall 4 is tapered upwardly to facilitate bleeding and has a central bore 5 therethrough in which a plug 6 is threadedly received. Plug 6 is provided with a restricted passage 7, which in one embodiment has a diameter of approximately .020 inch.

A generally cup-shaped movable closure wall 10 is positioned in recess 2 and is slidingly sealed therein by sealing ring 11. The center portion of wall 10 is raised as at 12. Raised portion 12 has a center bore 13 in which a conventional fill and bleed plug 14 is threadedly received. The center portion of wall 10 is raised or tapered upwardly to provide a strong compact construction and to facilitate proper bleeding.

After the wall 10 is inserted in recess 2, a coil compression spring 17 is placed on the upper surface of the wall. Then a locking member 18 is screwed over the upper end of container 2. The locking member serves the dual purpose of holding spring 17 compressed in place and forming an attachment rim by which the programmer can be attached to the shock testing equipment. This attachment is accomplished by passing bolts (not shown) through bolt holes 19 in member 18. Locking member 18 is provided with a circular central bore 29 to permit ready access to plug 14. Bore 13 is preferably larger than plug 6 to provide for easy access to the plug 6. The walls 4 and 10 and the side wall of recess 2 form a first chamber 21.

The lower end of the container 1 comprises a closure ring 23, a central sleeve 24, and a plunger unit 25. The plunger unit has a small diameter cylindrical stem portion 26; a circular large diameter internal portion or programming head 27; and an external impact head 28. Programming head 27 is secured to the stem 26 by a screw 29, and impact head 28 is secured to the stem by a screw 30 formed as an integral part of head 28.

Stem 26 is slidingly sealed in a central bore 31 in sleeve 24. The seal is formed by the close fit of stem 26 in bore 31 and by a conventional sealing ring 32. Sleeve 24 is secured in closure ring 23 by threads 33 for axial adjustment relative to the closure ring. The outer end of the sleeve has a plurality of recesses 34 for engagement by a pronged spanner wrench to turn the sleeve 24. The seal between the sleeve and closure ring is formed by a conventional sealing ring 35. The closure ring 23 is secured in place by threads 37 and is sealed by a conventional sealing ring 38. The closure ring has a plurality of recesses 39 for engagement by a pronged spanner wrench. One method of assembling the lower end of the programmer is as follows: ring 23 and sleeve 24 are assembled first; plunger unit 25 is inserted, absent one of the heads 27, 28; then the missing head is attached; and finally the entire assembly is secured in place by rotating along threads 37.

The inner end of closure ring 23 has a cylindrical recess 43 having a close fit with the periphery of the programming head 27. The fit between the side wall of recess 43 and the periphery of head 27 is close enough to provide a dynamic seal. For example, an annular spacing of .002 inch is preferred. It should be noted that the adjustment of sleeve 24 permits the inner end 44 of the sleeve to enter recess 43 and abut the end of programming head 27 in order to adjust the outer limit of travel of the plunger unit 25.

A second chamber 45 is formed in container 1 by the wall 4, the side walls of recesses 3 and 43, ring 23, sleeve 24, and plunger stem 26. It will be noted that chamber 45 has a large cross section portion formed by the wall of recess 3 and a smaller cross section portion formed by the wall of recess 43.

Operation of the programmer shown in FIGURES 1 and 2 will now be described. First the entire space inside the programmer is completely filled through the plug 14 with liquid, preferably silicon oil. It should be understood that although passage 7 and the close fit of head 27 in recess 43 each forms virtually a complete dynamic seal (that is, a seal against high velocity flow), they both permit the slow passage of fluid. This permits the entire inner space to be filled. However, for quicker filling of chamber 45, plug 6 can be temporarily removed, and head 27 can be positioned inwardly to clear the smaller recess 43. It will be understood that after the device is entirely filled, with plug 6 in place and plug 14 sealed, the spring 17 will maintain the fluid under sufficient pressure to force the plunger unit slowly downward until head 27 abuts the inner end 44 of sleeve 24. One way of filling chambers 21 and 45 with the desired liquid pressure is to admit the liquid from a source under pressure. However, a preferred way is to unscrew the locking member 18 during filling and then screw it down after the container has been filled and plug 14 has been replaced. In this way the container can simply be filled with liquid at atmospheric pressure. The desired internal static pressure is obtained by screwing down the locking member 18 until spring 17 creates the desired pressure. For example, a static pressure of approximately 15–50 pounds per square inch works very well.

After the programmer has been charged with fluid, it is attached in position on the shock testing apparatus (not shown). For example, member 18 is bolted to the bottom of a drop table so that the programmer cushions the impact of the table at the bottom of its fall. A preferred way of using the described programmer is in conjunction with shock testing equipment which includes a high strength elastomer pad against which the programmer head 28 impacts.

Upon impact, the large area of head 27 compresses the fluid which is dynamically trapped in the large cross section portion of chamber 45. The spring rate of this action, combined with the spring rate of the mentioned elastomer pad, is as shown on the left leg 50 on the force versus deflection diagram of FIGURE 3. As is well known in the art, this spring rate causes the straight line acceleration denoted by the left leg 51 on the acceleration versus time diagram of FIGURE 4. Although the drop table and test specimen are actually being slowed down by the programmer, the generic term, acceleration, is conventional in the field to denote any change in velocity and is so used herein.

When the programming head 27 moves out of the small recess 43, the fluid compressed in the large recess 3 will rush past the side of the programming head to fill the void behind the lower side of the piston. This action instantly reduces the pressure in chamber 45 and also reduces the area on which the small remaining pressure acts. More specifically the high pressure created by initial movement acts on the large cross section area of head 27, whereas the reduced pressure acts on the small cross section area of stem 26. As a result, the spring force falls substantially to zero as shown by the vertical right leg 52 of FIGURE 3. This reduction of the spring force causes a simultaneous reduction of the acceleration as shown by the right leg 53 of the sawtooth pulse in FIGURE 4.

The drop table to which the programmer is attached, still has a small downward velocity as the head 27 moves out of the small recess 43. This causes a secondary compression of the fluid as the small stem 27 moves into chamber 45. This secondary fluid pressure rise, acting on the small stem, serves as a very soft spring to bring the table slowly to maximum downward movement and then slowly move up. This soft spring rate is shown by lines 54 and 55 in FIGURE 3.

If the drop table is allowed to rest on the programmer, the fluid in chamber 45 will pass slowly through the restricted passage 7 and into the accumulator chamber 21. This allows the stem 26 to move slowly into the chamber 45 to compress spring 17 until a final rest position is obtained. The final rest position is caused by the upper end of moveable wall 10 engaging the member 18 or by the force of spring 17 equalling the weight of the drop table, whichever occurs first. When the table is lifted up for the next drop test, the spring-loaded wall 10 forces fluid back through passage 7. This causes the plunger to be forced outwardly until head 27 abuts the inner end of sleeve 24. Thus, the programmer automatically readies itself for the next drop test.

Shock testing procedures normally specify a variety of levels for the peak pulse acceleration. One way to provide different peak pulse levels is to employ a series of programmers, each designed for a specific different level. However, the programmer of this invention is easily adjustable to cover a substantial range of peak acceleration levels. Adjustment of the programmer is acomplished simply by turning sleeve 24 to adjust the penetration of its inner end 44 into chamber 45. Inward movement of sleeve 24 reduces the peak pulse level, and outward movement of sleeve 24 increases the peak pulse level. For example, if sleeve 24 is screwed outwardly, head 27 will travel further before it leaves recess 43, and will therefore create higher pressure in chamber 45. The dashed line 50' in FIGURE 3 denotes this increase in pressure, and dashed line 52' denotes the immediate reduction in pressure when head 27 moves out of recess 43. The corresponding high peak sawtooth pulse is denoted in FIGURE 4 by the dashed lines 51' and 53'.

Although a preferred embodiment of the present invention is shown and described herein, it is to be understood that modifications may be made therein without departing from the spirit and scope of the invention as set forth in the appended claims.

Having thus described the invention, what is claimed as new and desired to be secured by Letters Patent is:

1. A shock programmer comprising a chamber-forming container, a plunger slidingly sealed in an opening in said container, a moveable wall for said container, a stationary partition wall between said moveable wall and said plunger, means biasing said moveable wall to compress fluid between it and said stationary wall, a restricted passage connecting the portions of said chamber on opposite sides of said stationary wall, the portion of said chamber on the plunger side of said stationary wall having a large cross section portion spaced from said opening and a smaller cross section portion adjacent said opening, said plunger having an enlarged diameter portion receivable with a close fit in said smaller cross section portion, and said enlarged diameter portion being moveable out of said smaller cross section portion and into said large cross section portion, as said plunger is moved into said container.

2. A shock programmer as claimed in claim 1 in which said biasing means comprises a metal spring.

3. A shock programmer as claimed in claim 1 in which said chamber is completely filled with compressible liquid.

4. A shock programmer as claimed in claim 1 further comprising adjustable stop means for setting the limit of outward movement of said plunger.

5. A shock programmer comprising a chamber-forming container, a plunger slidingly sealed in an opening in said container, a moveable wall for said container, a stationary partition wall between said moveable wall and said plunger, means biasing said moveable wall to compress fluid between it and said stationary wall, a restricted passage connecting the portions of said chamber on opposite sides of said stationary wall, the portion of said chamber on the plunger side of said stationary wall having a large cross section portion spaced from said opening and a smaller cross section portion adjacent said opening, a sleeve threaded in the wall of said container and forming said opening in which the plunger is slidingly sealed, said plunger having a small cross section portion received in said sleeve and a substantially larger cross section portion inside said chamber, and said larger plunger portion at the limit of outward travel of the plunger having its end surface in abutment with the inner end of said sleeve and having its peripheral surface closely fitting within said smaller cross section portion of the chamber.

6. A shock programmer comprising a chamber-forming container open at one end, a closure ring sealed in said open end, said closure ring having a recess at its inner end to form a portion of the inner side wall of the container, said ring-formed portion of the inner side wall being of smaller cross section than the adjacent portion of the inner side wall, a sleeve secured in said ring for axial adjustment relative to the ring, a plunger having a small cross section portion slidingly sealed in said sleeve, said plunger having a larger cross section portion inside said container and moveable outwardly into abutment with the inner end of said sleeve, and said large plunger portion having its peripheral surface closely fitting within said ring-formed portion of the inner side wall of the chamber when said large plunger portion is in abutment with said sleeve.

7. A shock programmer as claimed in claim 6 in which the other end of said container has a moveable wall, means biasing said moveable wall toward said one end of the container, a partition wall between said moveable wall and said one end of the container, and a restricted passage connecting the portions of said chamber on opposite sides of said partition wall.

8. A shock programmer comprising a chamber-forming body having a recess at one end and a partition wall at the bottom of said recess, a moveable closure wall slidingly sealed in said recess to form a first chamber between itself and said partition wall, an end member attached to the recessed end of said body, spring means compressed between said moveable wall and said end member, said body forming a second chamber on the side of said partition wall remote from the moveable wall, a plunger slidingly sealed in an opening in the wall of said second chamber, a restricted passage connecting said first and second chambers, the inside wall of said second chamber having a large cross section portion spaced from said opening and a smaller cross section portion adjacent said opening, said plunger having an enlarged diameter portion receivable with a close fit in said smaller cross section portion, and said enlarged diameter portion being moveable out of said smaller cross section portion and into said large cross section portion as said plunger is moved into said second chamber.

9. A shock programmer as claimed in claim 8 further comprising means adjustable from outside said body for selectively setting the limit of outward travel of said plunger.

10. A shock programmer as claimed in claim 8 in which said end member has an aperture therein, said moveable wall has a portion raised toward said end member, and further comprising a fill plug in said raised portion and in line with said aperture.

11. A shock programmer as claimed in claim 8 in which said restricted passage has a diameter of .02 inch.

12. A shock programmer as claimed in claim 8, further comprising a sleeve in which said plunger is slidingly sealed, means for axially adjusting said sleeve, said plunger comprising a small diameter rod and a substantially larger diameter head, said head being engageable with the inner end of said sleeve to fix the outermost position of said plunger, and a sealing ring between said sleeve and said body and engaging the periphery of said sleeve.

13. A shock programmer as claimed in claim 12, in which said close fit is an annular space of .002 inch, and said restricted passage has a diameter of .02 inch.

14. A shock programmer for creating a sawtooth shock pulse comprising a chamber-forming container, a plunger slidingly sealed in an opening in said container, cooperating stop means on said plunger and container fixing the outermost position of said plunger, said plunger and container having cooperating portions causing initial inward motion of said plunger to reduce the volume of a first chamber and simultaneously increase the volume of a second chamber and causing subsequent inward movement to interconnect said first and second chambers, said second chamber having a substantial size at the time it is connected to said first chamber, and means for biasing said plunger normally to occupy said outermost position, said cooperating portions of said plunger and container forming a substantially complete separation between said first and second chambers during said initial inward movement, and said interconnection between said first and second chamber being substantially unobstructed.

15. A shock programmer as claimed in claim 14 in which said cooperating portions of the plunger and container are so arranged that when said plunger is positioned to interconnect said chambers, the area of said plunger upon which fluid pressure in said interconnected chambers is effective to expel the plunger is substantially less than the area upon which pressure in said first chamber is effective before said plunger is moved inwardly far enough to interconnect said chambers.

16. A shock programmer as claimed in claim 14 further comprising means for adjusting said programmer, said adjusting means comprising means for adjusting said stop means to change the outermost position of said plunger, said container having walls forming a third chamber separated from said first chamber by a restricted passage, one wall of said third chamber being a moveable wall, and means biasing said moveable wall to reduce the volume of said third chamber.

17. A shock programmer as claimed in claim 14 in which said cooperating portions of the programmer and plunger comprise a large diameter head on said plunger, said container having a smaller diameter internal portion adjacent said opening, said head being received with a close fit in said smaller diameter portion when said plunger is in said outermost position, said container having a larger diameter internal portion inwardly from said smaller diameter portion, and said plunger portion which is slidingly sealed in said opening having a substantially smaller diameter than said head.

References Cited by the Examiner
UNITED STATES PATENTS

| 2,695,777 | 11/1954 | Garrison et al. | 188—96 X |
| 2,793,031 | 5/1957 | Hartel | 267—64 |
| 2,925,262 | 2/1960 | Zumwalt | 267—64 X |

FOREIGN PATENTS

| 746,276 | 12/1944 | Germany. |
| 809,682 | 3/1959 | Great Britain. |

ARTHUR L. LA POINT, *Primary Examiner.*